C. B. AGAR.
MACHINE FOR MAKING ELBOWS FOR SPOUTS, CONDUCTORS, &c.
APPLICATION FILED JAN. 26, 1906.
919,804.
Patented Apr. 27, 1909.
5 SHEETS—SHEET 2.
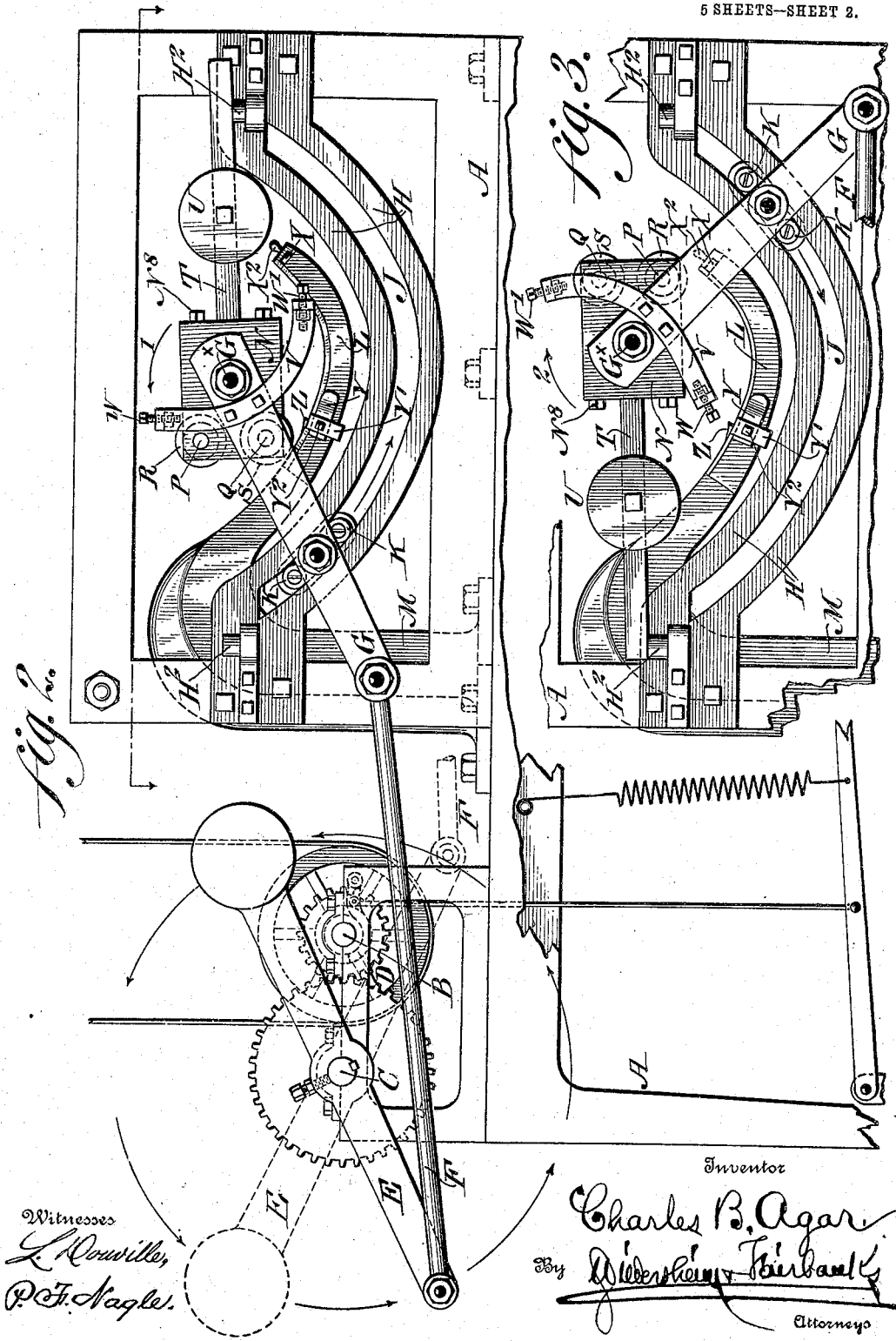
Witnesses
L. Douville,
P. F. Nagle.
Inventor
Charles B. Agar.
By Wilkinson Fairbank
Attorneys

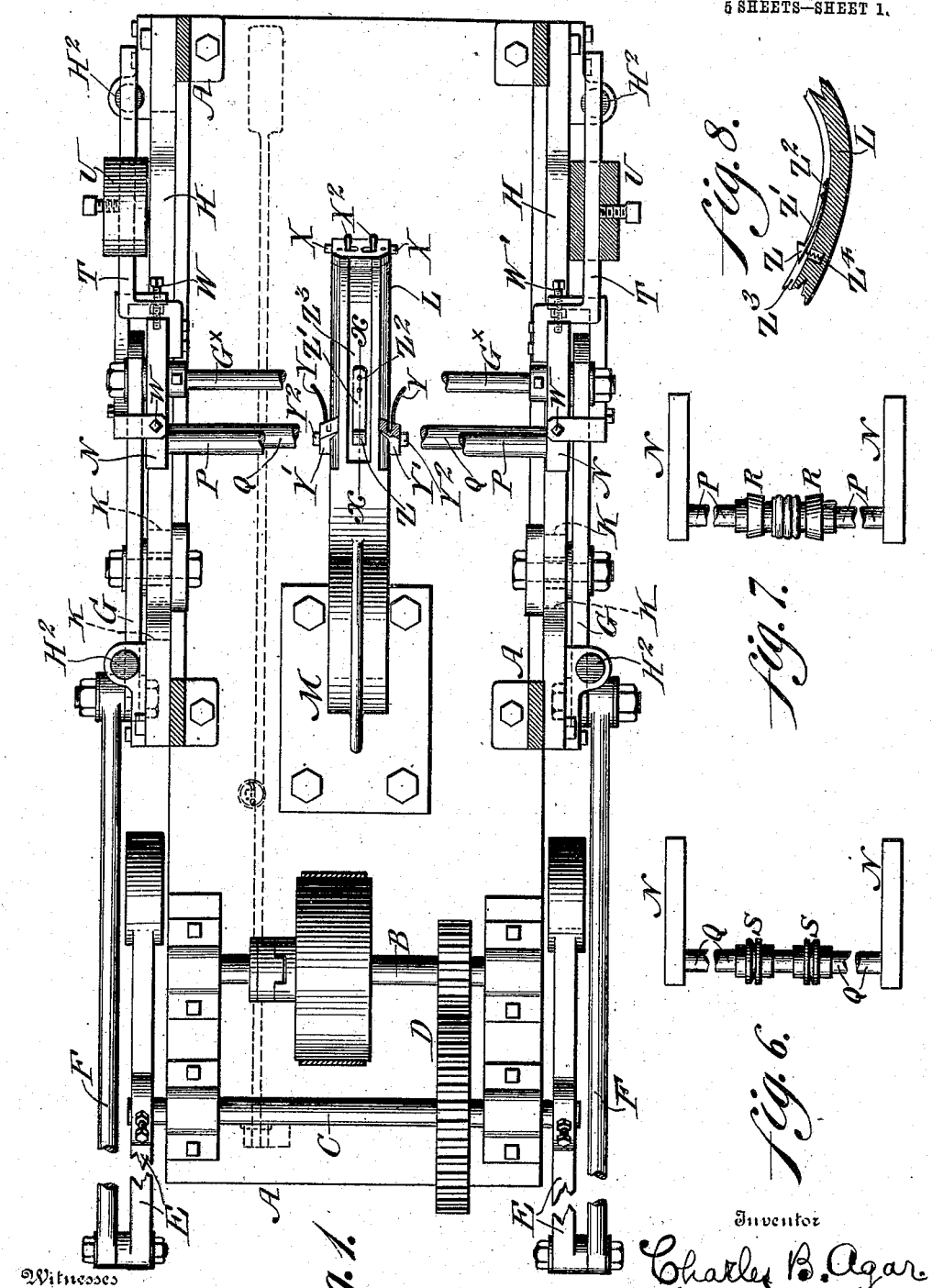

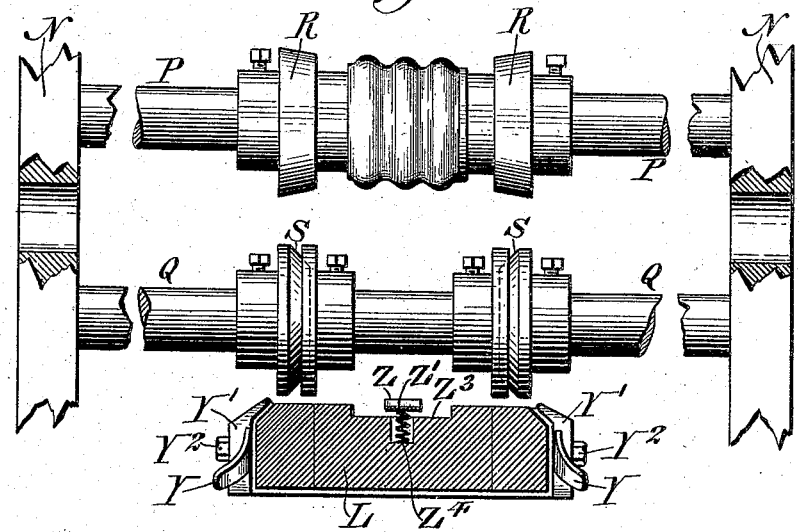
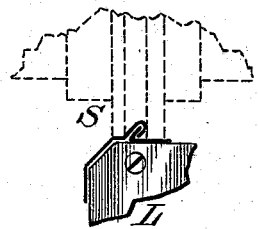
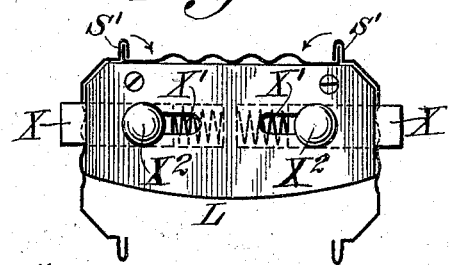
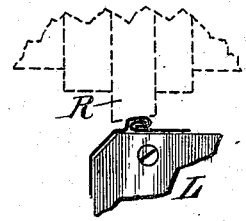
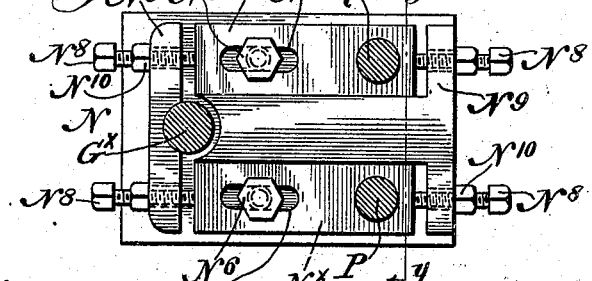
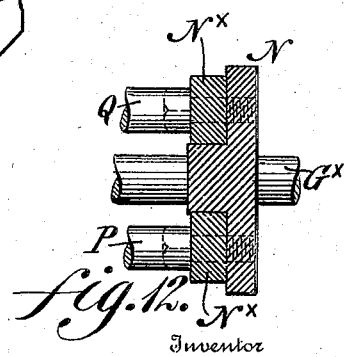

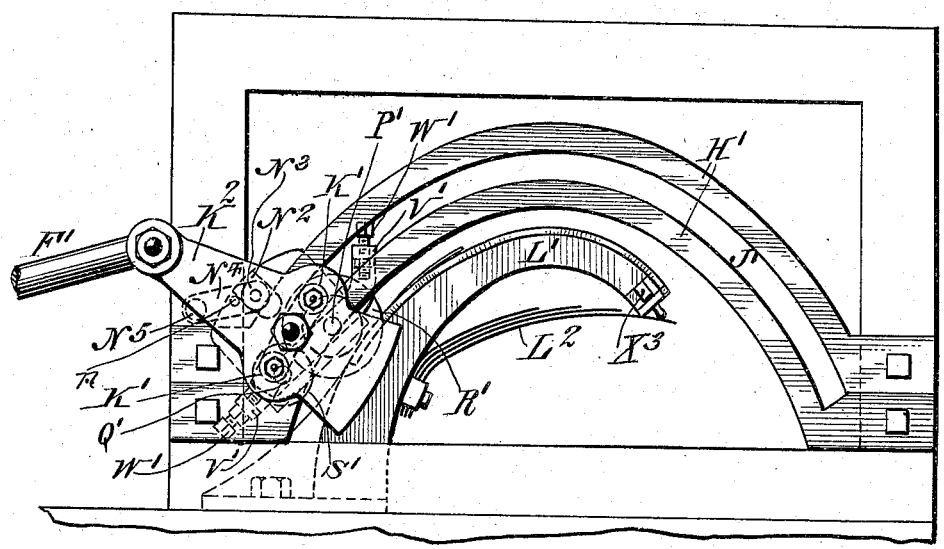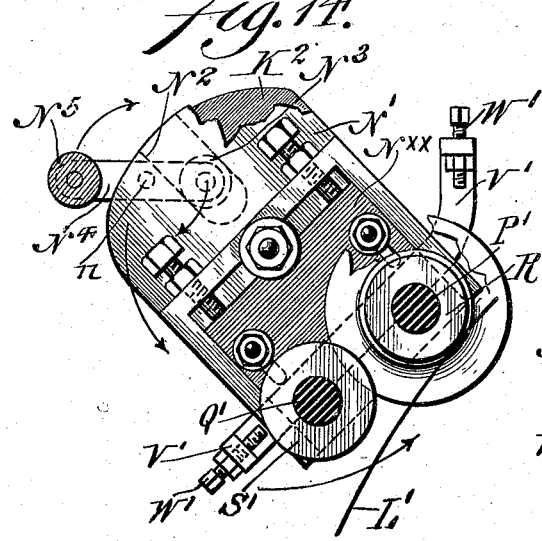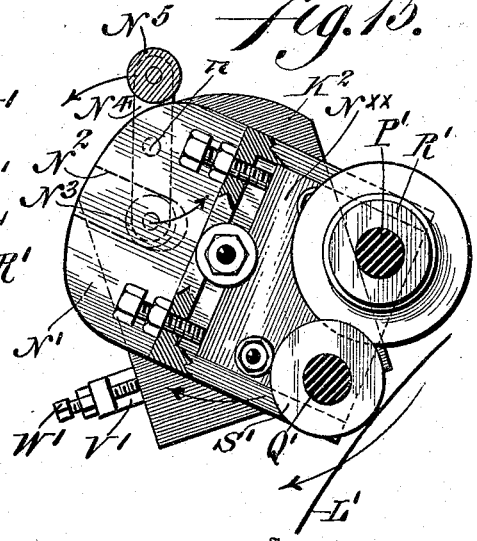

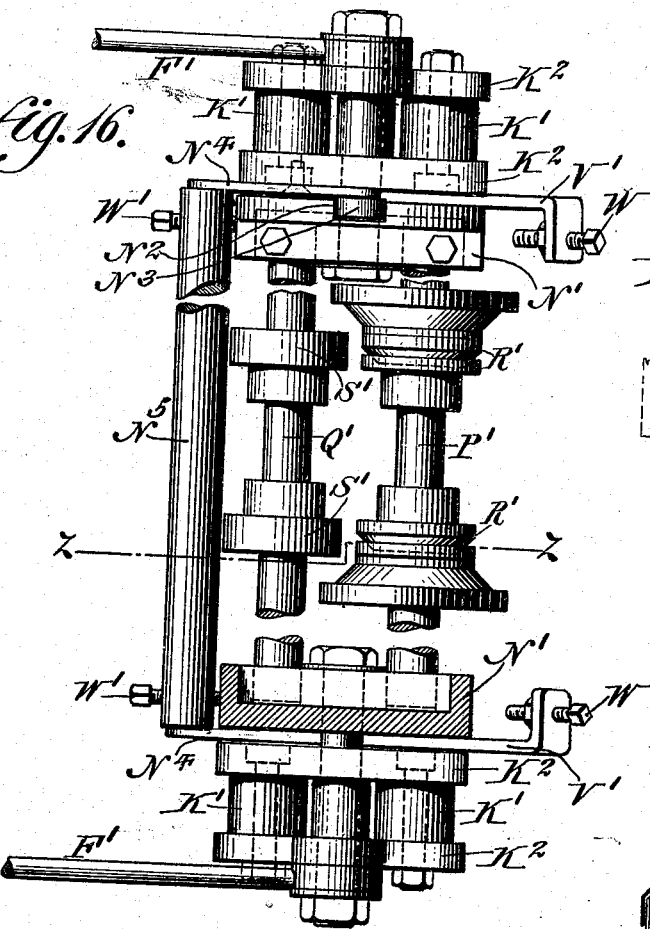

UNITED STATES PATENT OFFICE.

CHARLES B. AGAR, OF CAMDEN, NEW JERSEY, ASSIGNOR TO BENJAMIN P. OBDYKE, OF PHILADELPHIA, PENNSYLVANIA.

MACHINE FOR MAKING ELBOWS FOR SPOUTS, CONDUCTORS, &c.

No. 919,804.            Specification of Letters Patent.        Patented April 27, 1909.

Application filed January 26, 1906. Serial No. 298,009.

*To all whom it may concern:*

Be it known that I, CHARLES B. AGAR, a citizen of the United States, residing in the city and county of Camden, State of New Jersey, have invented a new and useful Machine for Making Elbows for Spouts, Conductors, &c., of which the following is a specification.

My invention consists of a machine adapted for forming curved elbows of sheet metal spouts, conductors, etc., the same being especially four-sided or of angular shape in cross section, the machine embodying a support for the plates of which the elbow is constructed and mechanism for partially closing the seams of said plates on the advance motion of the machine and for fully closing the same on the return motion thereof, the mechanism employed to effect said partial and complete closure being mounted on a common head or carrier which may be reversed so as to present the different mechanisms to the seams successively on the opposite motions of said carrier, the means involved and the operation thereof being hereinafter described and the novel features pointed out in the claims.

Figure 1 represents a plan view, partly sectional of a machine for forming elbows embodying my invention. Figs. 2 and 3 represent side elevations thereof, certain parts thereof being in different positions. Fig. 4 represents a partial end elevation and partial transverse section on an enlarged scale. Fig. 5 represents a front view of the bed or support for the plate during the primary seaming operation. Figs. 6 and 7 represent top views of the seaming or bending rollers employed. Fig. 8 represents a vertical section of a portion on line $x$—$x$ Fig. 1. Figs. 9 and 10 represent the successive steps of partially and fully forming the seams of the elbow. Fig. 11 represents a partial end elevation and partial longitudinal section of one of the heads employed. Fig. 12 represents a section thereof on line $y$—$y$ Fig. 1. Fig. 13 represents a side elevation of another portion of the machine embodying my invention. Figs. 14 and 15 represent a partial end elevation and partial longitudinal section on line $z$—$z$ Fig. 16. Fig. 16 represents a top or plan view of certain mechanism shown in Fig. 13. Fig. 17 represents an end elevation of the horn or bed shown in Fig. 13. Figs. 18 and 19 represent successive steps of forming the final seams. Fig. 20 represents a perspective view of a partially finished elbow. Fig. 21 represents a perspective view of a finished elbow.

Similar letters of reference indicate corresponding parts in the figures.

Referring to the drawings: A designates the frame of the machine, on which is mounted the driving shaft B to which power is communicated in any suitable manner.

C designates a countershaft which is mounted on the frame A and geared with said shaft B as at D or other suitable means. Connected with said shaft C are the weighted arms E on the proper ends of which are mounted the connecting rods F with which latter is pivotally connected the arms G.

Mounted on the table of the frame are the plates H in which are the downwardly curved slots J, the same receiving the rollers K, the walls of said slots thus guiding said rollers, whereby they travel in a circular direction thereof, said rollers K being mounted on the arms G intermediate of the ends thereof.

L designates a downwardly curved horn or bed which occupies a position in the longitudinal direction of the machine at the center thereof, it being elevated above the guide plates H and sustained at one end, at present, toward the driving shaft B, by the standard M which rises from the table of the frame A.

Pivotally mounted on the ends of the arms G by the shaft $G^{\times}$ are the heads N, the same forming bearings for the shafts P, Q, said shafts being eccentric in said head. On the shaft P are the bending rollers R and on the shaft Q are the bending rollers S, said rollers R, S, occupying a position above the bed L, it being noticed that the face of the roller R is conical as shown in Figs. 4 and 7 and the face of the roller S is formed with an undercut groove having one wall inclined as shown in Figs. 4 and 6.

Connected with the heads N are the arms T on which are adjustably fitted the weights U, it being noticed that said heads are freely mounted on the arms G, whereby they may overturn and thus bring either of the rollers R, S, adjacent to the bed L for purposes to be hereinafter explained.

Connected with the sides of the arms G are the segmental arms V on the ends of which are bolts W, W', which project in such a manner respectively toward the upper and lower sides of the heads N as to cause the overturning of the latter as will be hereinafter described.

On the outer ends of the bed L are plates or bolts X which are fitted in openings in said bed so as to be capable of motion in a lateral direction so as to project from said bed as shown in Figs. 1 and 5 and form stops as will be hereinafter explained, said plates being held in outward or operative position by means of the springs X' which bear against said plates and a fixed member of the head. On the sides of the bed are the guiding wings Y which are secured thereto by the blocks Y' and bolts Y² or other suitable means, said blocks forming stops. On the upper side of the bed is a resilient stop formed of the shoulder Z which is carried by the spring plate Z', one end of which is connected with said bed as at Z², the latter having a recess Z³ therein to permit the stop to lower thereinto, said bed also containing a spring Z⁴ which bears against said stop to raise the same to normal position.

Referring to Figs. 13, 14, 15, 16 and 17, L' designates an upwardly curved or circular bed and H' designates plates with upwardly curved slots or recesses J' therein, said slots receiving the guide rollers K', whose bearings are on a traveler K² and have pivotally connected with them the pitmen F' which receive motions similar to the pitmen F. N' designates heads which are pivotally mounted on said traveler K² and have mounted on them the shafts P', Q', on which are respectively secured the bending rollers R', S', which are similar in contour to those of the rollers R, S. To the sides of the heads N' are secured the arm V' which carries on its ends the bolts W' for purposes similar to the bolts W. In the heads N' are slots N² which freely receive the rollers N³ which are mounted on the links N⁴, the latter being pivotally mounted as at n and connected by the handle N⁵ whereby by proper operation of the latter, said heads may be overturned as will be apparent on reference to Figs. 14 and 15.

Referring to Fig. 11 it will be noted that the heads N have adjustably mounted thereon the bearing blocks N<sup>×</sup> which have the elongated slots N⁷ through which pass the bolts N⁶, and bolts N⁸ adjustable in cleats N⁹ on the heads bearing against opposite ends of the bearing blocks and provided with jam nuts N¹⁰ serve to adjust the shafts P and Q and their rollers R and S.

In Figs. 14 and 15 the travelers K² are provided with movable blocks N<sup>××</sup> in which are mounted the shafts P' and Q', bolts and nuts being provided as shown to permit of adjustment of the said shafts and their rollers in a similar manner to that above described in connection with Fig. 11.

The operation is as follows: The plates of metal of which an elbow is to be constructed have their edges formed with tongues and grooves which are adapted to lock each other as shown in Fig. 5. Those of such plates forming three sides of said elbow are connected as shown in said figures and placed on the bed L, so that the edge of the top plate abuts against the shoulder Z said top plate being concave and the edges of the side plates enter between the wings Y and are held thereby against the blocks Y'. The front edges of the side plate abut against the latches or plates X and thus the several connected plates as shaped rest firmly on the bed. Power is now applied to the shaft B and consequently to the shaft C, whereby motions are imparted to the arms E, the pitmen F and arms G, the latter then carrying the rollers K through the curved slots or ways J and advancing the head N whereby the rollers S bear downwardly against the upwardly projecting seams S², S², of the three plates and owing to the conically grooved or recessed faces of said rollers, said seams are bent laterally as shown in Fig. 9. When the arms G have completed their stroke, the bolts W on the arms V bear against the adjacent sides of the head N and turn the same on the shaft G<sup>×</sup> in the direction of the arrow 1 Fig. 2 when, as said head is out of its center of gravity, the weighted arms T quickly overturn said head and place the rollers S above and consequently the rollers R below, see Fig. 3. The motions of the arms G are oscillatory to allow of the change of position of the parts. The head is now carried backward and the rollers R are brought into contact with the laterally bent seams Fig. 9, whereby owing to the inclined faces of said rollers R, the seams are pressed flat and tightly closed, the result being shown in Figs. 10 and 20, it being evident that the three plates are now firmly connected as one. The latches or plates X are now drawn in, when the three-sided shape is slipped from the bed.

It will be seen that when the seams are subjected to the action of either set of rollers, and the top plate accordingly depressed, the shoulder Z yields downwardly as the rollers pass over the place of its location, but quickly rises as the rollers continue their motions so that said top plate remains practically engaged by said shoulder. It will be seen that when the head reaches its full return motion, it is engaged by the other bolt W' which presses against the same in the direction of arrow 2 and when said head again passes the center of gravity, it is overturned to its first position by the weight arm T, whereby the rollers S are below and the rollers R above, the arms C owing to their oscillations then changing from the position shown in Fig. 3 to that shown in Fig. 2, the machine then being stopped. The plates H are provided at opposite ends thereof with cushions or buffers which receive the blows or impact of the arms T in their overturning motions. The fourth plate which is convex is now connected by its tongues with the grooves of the side plates and applied to the bed L', said fourth plate being on top of said bed, see Fig. 17, it being firmly held down in said bed by the action of the springs L² see Fig. 13, which springs are connected with the underside of the bed and contact with and now bear downwardly against the inner side of the lower plate as shown in said Fig. 17. Then the head N' is advanced when the rollers R' engage with the top seams S² formed by the upwardly projecting tongues and grooves and bend the same laterally as shown in Fig. 18. Then when the head has traveled to full extent in its advancing direction, it is overturned by hand by the operation of the roller N³ and link N⁴ due to the handle N⁵ and the rollers S' bear downwardly against the bent seams and as the head makes its return motion, said seams are pressed down flat and closed see Fig. 19, thus firmly connecting the side plates with the present top plate, and completing the connection of the four sided shape by hand to its first position, so as to repeat the operations named, the rollers R' then being below. The latches X³ are now drawn back when the shaped article shown in Fig. 21 may be entirely removed from the bed.

Having thus described my invention, what I claim as new and desire to secure by Letters Patent, is:

1. In a machine of the character described, a bed, seam bending rollers, a head mounted for reversion and carrying said rollers, means for reversing the head, and devices for guiding said means in curved direction.

2. In a machine of the character stated, a head mounted for reversion, a pair of seam-bending rollers carried by said head, a shaft on which said head is pivotally mounted, an oscillating arm carrying said shaft and means adapted to engage opposite sides of said head, the members of said seam-bending rollers having their working faces adapted respectively first to close the seam and next to fully close and compress the same.

3. In a machine of the character stated, a pair of seam-bending rollers, the members of the same having their working faces adapted respectively to partly close a seam and next to fully close and compress the same an oscillating member adapted to engage opposite sides of said head and a head carrying said rollers adapted to be overturned and bring either of said rollers into operative position.

4. In a machine of the character stated, a head, seam-bending rollers mounted thereon, a shaft on which said head is pivotally mounted, an oscillating arm carrying said shaft and a member on said arm adapted to engage opposite sides of said head.

5. In a machine of the character stated, a head, seam-bending rollers mounted thereon, a shaft on which said head is pivotally mounted, an oscillating arm carrying said shaft, a member on said arm adapted to engage opposite sides of said head to turn the same in opposite directions and a weighted member on said head to cause rapid turning operations of the same.

6. In a machine of the character stated, a head, seam-bending rollers on said head, a shaft by which said head is freely mounted, an oscillating arm by which said shaft is carried, means for operating said arm and a member on said arm, the ends of the same having means adapted to abut successively opposite sides of said head to move the latter in reverse directions.

7. In a machine of the character stated, a head, seam-bending rollers on said head, a shaft by which said head is freely mounted, an oscillating arm by which said shaft is carried, means for operating said arm, a member on said arm, the ends of the same having means adapted to abut successively opposite sides of said head to move the latter in reverse directions, and a device on said head adapted to rapidly impart full reverse motions to said head.

8. In a machine of the character stated, a head, seam-bending rollers mounted thereon, a shaft by which said head is pivotally mounted, an oscillating arm carrying said shaft, a member on said arm adapted to engage opposite sides of said head, to turn the same in opposite directions, a weighted member on said head to cause rapid turning operations of the same and buffers on which said member may drop.

9. In a machine of the character stated, a head, seam-bending rollers mounted thereon, a member, means on the ends of said member adapted to abut against opposite sides of said head, an oscillating arm carrying said member and on which said head is mounted, a plate, and a weight on said member whereby the head may be overturned.

10. A plate having a curved slot therein, a roller in said slot, an oscillating arm carrying said roller, an overturning head carried by a shaft mounted on said arm, seam-bending rollers on said head, means for operating said arm and a weighted member on said head.

11. In a machine of the character stated, a bed having a resiliently mounted shoulder on the face thereof and a roller mounted to pass over said bed and shoulder.

12. In a machine of the character stated, a curved bed having on the side thereof a stop and a guide leading thereto and a spring actuated shoulder.

13. In a machine of the character stated, a curved bed having thereon at the front a movable, laterally projecting stop.

14. In a machine of the character stated, a bed having thereon a stop at the center thereof and stops at one end thereof.

15. In a machine of the character stated, a curved supporting bed, plates having curved slots substantially concentric with said bed and a head having guiding means traveling in said slots.

16. In a machine of the character stated, a curved supporting bed, plates having curved slots substantially concentric with said bed, a head having guiding means traveling in said slots, a shaft, bearings for said shaft movable in opposite directions, seam-bending rollers, and means for adjusting the positions of said rollers.

17. In a machine of the character stated, a bed having a working face of curved form, a stop at the center, laterally movable stops at the front, a guide plate beneath said bed and having a curved slot, a seam bending roller above said bed, a head mounted for reversion and a roller movable in and guided by said slot and serving to raise and lower said head in its opposite directions of the machine.

18. A machine of the character stated adapted to unite the several sides of a sheet metal elbow, said machine comprising a reversibly mounted head and means movable with said head and adapted to successively partially close the respective seams of said sides and fully close the same.

CHARLES B. AGAR.

Witnesses:
JOHN A. WIEDERSHEIM,
S. R. CARR.